US006248225B1

(12) United States Patent
Palaika et al.

(10) Patent No.: US 6,248,225 B1
(45) Date of Patent: Jun. 19, 2001

(54) PROCESS FOR FORMING A TWO-COAT ELECTRODEPOSITED COMPOSITE COATING THE COMPOSITE COATING AND CHIP RESISTANT ELECTRODEPOSITED COATING COMPOSITION

(75) Inventors: Thomas Palaika, Cheswick; Ellor J. Van Buskirk, Wexford, both of PA (US); Victor G. Corrigan, North Olmsted, OH (US); Venkatachalam Eswarakrishnan, Allison Park, PA (US); Gregory J. McCollum, Gibsonia, PA (US); Robert R. Zwack, Allison Park, PA (US); Philippe Faucher, Levallois-Perret (FR); Craig A. Wilson; Chester J. Szymanski, both of Allison Park, PA (US); James E. Poole, Gibsonia, PA (US); Keith S. Ritter, Allison Park, PA (US); Richard F. Syput, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/309,851

(22) Filed: May 11, 1999

Related U.S. Application Data

(60) Provisional application No. 60/086,693, filed on May 26, 1998, and provisional application No. 60/086,707, filed on May 26, 1998.

(51) Int. Cl.$^7$ .................................................. C25D 13/12

(52) U.S. Cl. .................... 204/484; 204/493; 204/500; 204/509; 524/591; 524/840; 524/901

(58) Field of Search ............................... 204/484, 493, 204/500, 509; 524/901, 591, 840

(56) References Cited

U.S. PATENT DOCUMENTS

| | | |
|---|---|---|
| 1,873,945 | 8/1932 | Kraenzlein et al. . |
| 3,236,895 | 2/1966 | Lee et al. .............................. 260/584 |
| 3,455,806 | 7/1969 | Spoor et al. .......................... 204/181 |
| 3,488,272 | 1/1970 | Frisch et al. ......................... 204/181 |
| 3,663,389 | 5/1972 | Koral et al. .......................... 204/181 |
| 3,674,671 | 7/1972 | Stromberg ............................ 204/181 |
| 3,749,657 | 7/1973 | Le Bras et al. ...................... 204/181 |
| 3,793,278 | 2/1974 | De Bona et al. ............. 260/29.2 EP |
| 3,917,570 | 11/1975 | Chang et al. .................... 260/75 TN |
| 3,928,157 | 12/1975 | Suematsu et al. ................... 204/181 |
| 3,947,338 | 3/1976 | Jerabek et al. ....................... 204/181 |
| 3,947,339 | 3/1976 | Jerabek et al. ....................... 204/181 |
| 3,954,899 | 5/1976 | Chang et al. ......................... 260/849 |
| 3,962,165 | 6/1976 | Bosso et al. ................. 260/29.2 EP |
| 3,962,522 | 6/1976 | Chang et al. ......................... 428/423 |
| 3,975,346 | 8/1976 | Bosso et al. ................. 260/29.2 EP |
| 3,984,299 | 10/1976 | Jerabek ................................ 204/181 |
| 3,984,922 | 10/1976 | Rosen ....................................... 35/4 |
| 4,001,101 | 1/1977 | Bosso et al. ......................... 204/181 |
| 4,018,849 | 4/1977 | Chang et al. ......................... 260/849 |
| 4,034,017 | 7/1977 | Chang et al. ..................... 260/859 R |
| 4,066,591 | 1/1978 | Scriven et al. ................. 260/29.2 TN |
| 4,115,226 | * 9/1978 | Zwack et al. ....................... 204/181 C |
| 4,116,900 | 9/1978 | Belanger ........................... 260/18 EP |
| 4,134,866 | 1/1979 | Tominaga et al. ............... 260/18 PN |
| 4,134,932 | 1/1979 | Kempter et al. ...................... 260/831 |
| 4,139,672 | 2/1979 | Ozawa et al. ......................... 428/323 |
| 4,147,676 | 4/1979 | Pampouchidis ................. 260/23 TN |
| 4,147,679 | 4/1979 | Scriven et al. ................. 260/29.2 TN |
| 4,176,099 | 11/1979 | Pampouchidis et al. ........ 260/18 TN |
| 4,182,828 | 1/1980 | Reischl et al. ......................... 528/69 |
| 4,197,224 | 4/1980 | Schmolzer et al. ............. 260/22 TN |
| 4,208,262 | 6/1980 | Kubo et al. ....................... 204/181 T |
| 4,222,837 | 9/1980 | Hazen ............................... 204/181 C |
| 4,229,335 | 10/1980 | Ting et al. ....................... 260/29.4 R |
| 4,259,163 | 3/1981 | Suzuki et al. .................... 204/181 T |
| 4,315,840 | 2/1982 | Kempter et al. ................. 260/18 TN |
| 4,373,013 | 2/1983 | Yoshizumi ............................ 428/570 |
| 4,375,498 | 3/1983 | Le Minez et al. ................... 428/416 |
| 4,382,114 | 5/1983 | Höhlein et al. .................... 428/423.1 |
| 4,389,509 | 6/1983 | Pampouchidis et al. ............. 524/591 |
| 4,397,990 | 8/1983 | Kooymans et al. .................. 525/167 |
| 4,419,467 | 12/1983 | Wismer et al. ....................... 523/414 |
| 4,421,620 | 12/1983 | Kaylo et al. ...................... 204/181 C |
| 4,423,166 | 12/1983 | Moriarity et al. .................... 523/414 |
| 4,427,820 | 1/1984 | Backhouse et al. .................. 524/504 |
| 4,431,764 | 2/1984 | Yoshizumi ............................ 524/409 |
| 4,452,830 | 6/1984 | Yoshizumi ............................ 427/215 |
| 4,457,965 | 7/1984 | Rocholl et al. ....................... 428/141 |
| 4,468,307 | 8/1984 | Wismer et al. ................... 204/181 C |
| 4,477,536 | 10/1984 | Wright et al. ........................ 428/522 |
| 4,489,135 | 12/1984 | Drexler et al. ..................... 428/423.1 |

(List continued on next page.)

FOREIGN PATENT DOCUMENTS

| | | |
|---|---|---|
| 1329291 | 5/1994 | (CA) . |
| 2222803 | 12/1996 | (CA) . |
| 2 707 405 | 1/1978 | (DE) . |

(List continued on next page.)

OTHER PUBLICATIONS

Mueller et al., DE 3613650, 22.09.93, Abstract.*
"Electrocoagulation of Waterborne Polymers in the Presence of Carbon Black", Makromol. Chem., Macromol, Symp. 8, 285–322 (1987).
"Two–Coat Electrocoat", Focus : Electrodeposition of Paint, Products Finishing (Oct. 1992) pp 54–59.

(List continued on next page.)

Primary Examiner—K. Mayekar
(74) Attorney, Agent, or Firm—William J. Uhl; Deborah M. Altman

(57) ABSTRACT

A process for applying two electrodeposited coatings, one on top of the other, to an electrically conductive substrate is provided. An electrically conductive first coating is applied to provide for corrosion resistance and a second polyurethane-based coating is applied to the first coating to provide chip resistance. Also, aqueous dispersions of the polyurethane coating compositions are disclosed.

56 Claims, No Drawings

U.S. PATENT DOCUMENTS

| | | | |
|---|---|---|---|
| 4,522,958 | 6/1985 | Das et al. | 523/212 |
| 4,526,910 | 7/1985 | Das et al. | 523/220 |
| 4,544,687 | 10/1985 | Schupp et al. | 523/414 |
| 4,558,090 | 12/1985 | Drexler et al. | 524/591 |
| 4,563,372 | 1/1986 | Kurauchi et al. | 427/409 |
| 4,569,966 | 2/1986 | Piccirilli et al. | 524/589 |
| 4,576,979 | 3/1986 | Schupp et al. | 523/404 |
| 4,598,111 | 7/1986 | Wright et al. | 524/40 |
| 4,608,416 | 8/1986 | Schupp et al. | 525/130 |
| 4,623,690 | 11/1986 | Patzschke et al. | 524/538 |
| 4,624,801 | 11/1986 | Kawaguchi et al. | 252/500 |
| 4,652,470 | 3/1987 | Das et al. | 427/407.1 |
| 4,677,004 | 6/1987 | Das et al. | 427/407.1 |
| 4,692,382 | 9/1987 | Schmitt et al. | 428/414 |
| 4,692,383 | 9/1987 | Schmitt et al. | 428/414 |
| 4,728,543 | 3/1988 | Kurauchi et al. | 427/407.1 |
| 4,728,545 | 3/1988 | Kurauchi et al. | 427/409 |
| 4,755,418 | 7/1988 | DebRoy et al. | 428/215 |
| 4,755,434 | 7/1988 | Fujii et al. | 428/461 |
| 4,757,113 | 7/1988 | Paar | 525/124 |
| 4,761,212 | 8/1988 | Watanabe et al. | 204/181.1 |
| 4,761,337 * | 8/1988 | Guagliardo et al. | 428/425.8 |
| 4,781,808 | 11/1988 | Geist et al. | 204/181.7 |
| 4,789,566 | 12/1988 | Tatsuno et al. | 427/388.2 |
| 4,793,867 | 12/1988 | Charles et al. | 148/6.15 Z |
| 4,812,492 | 3/1989 | Eckes et al. | 523/351 |
| 4,814,208 | 3/1989 | Miyazaki et al. | 427/402 |
| 4,818,356 | 4/1989 | Geist et al. | 204/181.1 |
| 4,840,715 | 6/1989 | Misawa et al. | 204/181.1 |
| 4,872,961 | 10/1989 | McIntyre et al. | 204/181.7 |
| 4,882,090 | 11/1989 | Batzill et al. | 252/511 |
| 4,882,228 | 11/1989 | Nakahama | 428/421 |
| 4,888,244 | 12/1989 | Masubuchi et al. | 428/416 |
| 4,891,111 | 1/1990 | McCollum et al. | 204/181.7 |
| 4,894,261 | 1/1990 | Gulbins et al. | 427/379 |
| 4,911,811 | 3/1990 | Mullaney, Jr. | 204/192.14 |
| 4,916,019 | 4/1990 | Nakatani et al. | 428/418 |
| 4,917,955 | 4/1990 | Porter, Jr. et al. | 428/413 |
| 4,933,214 | 6/1990 | Sugiura et al. | 427/379 |
| 4,959,277 | 9/1990 | Saeki et al. | 428/623 |
| 4,968,399 | 11/1990 | Tsuchiya et al. | 204/181.1 |
| 4,974,307 | 12/1990 | Uebayashi et al. | 29/460 |
| 4,981,759 | 1/1991 | Nakatani et al. | 428/626 |
| 4,988,420 | 1/1991 | Batzill et al. | 204/181.1 |
| 4,990,579 | 2/1991 | Paar | 525/528 |
| 5,011,733 | 4/1991 | Hiraki et al. | 428/336 |
| 5,021,502 | 6/1991 | Patzschke et al. | 524/591 |
| 5,047,294 * | 9/1991 | Schwab et al. | 428/432.1 |
| 5,047,493 | 9/1991 | Schipfer et al. | 528/45 |
| 5,059,652 | 10/1991 | Schmolzer et al. | 524/591 |
| 5,096,555 | 3/1992 | Schupp et al. | 204/181.7 |
| 5,104,507 | 4/1992 | Offenburger | 204/180.6 |
| 5,104,583 | 4/1992 | Richardson | 252/518 |
| 5,114,756 | 5/1992 | Mirabeau et al. | 427/379 |
| 5,130,004 | 7/1992 | Johnson et al. | 204/181.7 |
| 5,132,180 | 7/1992 | Kishi et al. | 428/457 |
| 5,178,736 | 1/1993 | Richardson | 204/181.1 |
| 5,186,813 | 2/1993 | Helms | 205/171 |
| 5,188,716 | 2/1993 | Schwerzel et al. | 204/181.7 |
| 5,203,975 | 4/1993 | Richardson | 204/181.1 |
| 5,212,273 | 5/1993 | Das et al. | 526/323.1 |
| 5,229,210 | 7/1993 | Kasukawa et al. | 428/416 |
| 5,236,564 | 8/1993 | Berg et al. | 204/181.1 |
| 5,242,716 | 9/1993 | Iwase et al. | 427/407.1 |
| 5,258,424 | 11/1993 | Yagi et al. | 523/221 |
| 5,275,707 | 1/1994 | Yamada et al. | 204/181.1 |
| 5,294,665 | 3/1994 | Pedain et al. | 524/591 |
| 5,298,148 | 3/1994 | Yasuoka et al. | 205/50 |
| 5,326,596 | 7/1994 | Kasari et al. | 427/379 |
| 5,328,579 | 7/1994 | Kasukawa et al. | 204/181.1 |
| 5,334,650 | 8/1994 | Serdiuk et al. | 524/591 |
| 5,346,958 | 9/1994 | Yukawa et al. | 525/124 |
| 5,352,733 | 10/1994 | Hart | 524/840 |
| 5,376,457 | 12/1994 | Smith | 428/457 |
| 5,378,735 | 1/1995 | Hosokawa et al. | 522/79 |
| 5,385,655 | 1/1995 | Brent et al. | 204/181.1 |
| 5,385,656 | 1/1995 | Doebler et al. | 204/181.1 |
| 5,389,219 * | 2/1995 | Zwack et al. | 204/181.1 |
| 5,389,406 | 2/1995 | Doebler et al. | 427/407.1 |
| 5,395,659 | 3/1995 | Gräf et al. | 427/407.1 |
| 5,425,970 | 6/1995 | Lahrmann et al. | 427/493 |
| 5,439,710 | 8/1995 | Vogt et al. | 427/407.1 |
| 5,483,012 * | 1/1996 | Midogohchi et al. | 525/459 |
| 5,507,928 | 4/1996 | Bohmert et al. | 204/488 |
| 5,525,650 | 6/1996 | Clark et al. | 523/400 |
| 5,543,084 | 8/1996 | Kinlen et al. | 252/500 |
| 5,552,227 | 9/1996 | Göldner | 428/423.1 |
| 5,556,518 | 9/1996 | Kinlen et al. | 204/484 |
| 5,556,527 | 9/1996 | Igarashi et al. | 204/488 |
| 5,588,989 | 12/1996 | Vonk et al. | 106/14.12 |
| 5,589,228 | 12/1996 | Wegner et al. | 427/407.1 |
| 5,630,922 * | 5/1997 | Eswarakrishnan et al. | 204/499 |
| 5,633,297 | 5/1997 | Valko et al. | 204/500 |
| 5,663,244 | 9/1997 | Barancyk et al. | 525/456 |
| 5,674,560 | 10/1997 | Tanigami et al. | 427/202 |
| 5,676,813 | 10/1997 | Nakamura et al. | 205/50 |
| 5,686,012 | 11/1997 | Hayashi et al. | 252/62.56 |
| 5,698,310 | 12/1997 | Nakamura et al. | 428/328 |
| 5,698,330 | 12/1997 | Bederke et al. | 428/423.1 |
| 5,709,950 | 1/1998 | Burgman et al. | 428/423.1 |
| 5,721,018 | 2/1998 | Göldner et al. | 427/407.1 |
| 5,731,089 | 3/1998 | Kunikiyo et al. | 428/423.1 |
| 5,733,962 | 3/1998 | Osaka et al. | 524/449 |
| 5,767,191 | 6/1998 | Zawacky et al. | 24/591 |
| 5,837,766 | 11/1998 | Metro et al. | 524/495 |
| 5,849,855 * | 12/1998 | Usui et al. | 528/45 |
| 5,863,646 | 1/1999 | Verardi et al. | 428/323 |
| 5,869,198 | 2/1999 | Erne et al. | 428/626 |
| 5,882,734 | 3/1999 | Blum et al. | 427/407.1 |
| 5,908,667 | 6/1999 | Blum et al. | 427/407.1 |
| 5,914,162 | 6/1999 | Bilkadi | 428/35.8 |
| 5,945,499 * | 8/1999 | Ohrbom et al. | 528/75 |
| 5,998,504 | 12/1999 | Groth et al. | 523/213 |

FOREIGN PATENT DOCUMENTS

| | | |
|---|---|---|
| 19529394 | 2/1996 | (DE) . |
| 19519665 | 9/1996 | (DE) . |
| 19530226C2 | 2/1997 | (DE) . |
| 19642970 | 4/1997 | (DE) . |
| 19628361A1 | 1/1998 | (DE) . |
| 19716234A1 | 4/1998 | (DE) . |
| 19709467C1 | 10/1998 | (DE) . |
| A 12 463 | 6/1980 | (EP) . |
| 0 089 497 | 9/1983 | (EP) . |
| 0274389A1 | 7/1988 | (EP) . |
| 0 402 181 | 12/1990 | (EP) . |
| 0421247 | 4/1991 | (EP) . |
| 0426327A2 | 5/1991 | (EP) . |
| 0 548 845 | 6/1993 | (EP) . |
| 0823289 | 2/1998 | (EP) . |
| 2 373 594 | 8/1978 | (FR) . |
| 1309356 | 3/1973 | (GB) . |
| 2129807A | 5/1984 | (GB) . |
| 2 249 496 | 5/1992 | (GB) . |
| 2295335A | 5/1996 | (GB) . |
| 2297049A | 7/1996 | (GB) . |
| 52-140551 | 11/1977 | (JP) . |
| 53-108138 | 9/1978 | (JP) . |
| 55-11175 | 1/1980 | (JP) . |
| 60-7716 | 2/1985 | (JP) . |
| 60-150870 | 8/1985 | (JP) . |

| | | |
|---|---|---|
| 61-149497 | 7/1986 | (JP) . |
| 62-061675 | 3/1987 | (JP) . |
| 63-134696 | 6/1988 | (JP) . |
| 63-274799 | 11/1988 | (JP) . |
| 63-317695 | 12/1988 | (JP) . |
| 64-4663 | 1/1989 | (JP) . |
| 2104698 | 4/1990 | (JP) . |
| 2228376 | 9/1990 | (JP) . |
| 3-296567 | 12/1991 | (JP) . |
| 54-1335 | 12/1991 | (JP) . |
| 5-43696 | 2/1993 | (JP) . |
| 5-15533 | 3/1993 | (JP) . |
| 5-51553 | 3/1993 | (JP) . |
| 5065416 | 3/1993 | (JP) . |
| 6-15223 | 1/1994 | (JP) . |
| 6-57496 | 3/1994 | (JP) . |
| 6-65759 | 3/1994 | (JP) . |
| 6-65760 | 3/1994 | (JP) . |
| 6057496 | 3/1994 | (JP) . |
| 7-41994 | 2/1995 | (JP) . |
| 7-62214 | 3/1995 | (JP) . |
| 9125286 | 5/1997 | (JP) . |
| 9-165450 | 6/1997 | (JP) . |
| 2667883 | 10/1997 | (JP) . |
| 9324292 | 12/1997 | (JP) . |
| 10008291 | 1/1998 | (JP) . |
| 2759216 | 5/1998 | (JP) . |
| WO86/03791 | 7/1986 | (WO) . |
| WO91/12899 | 9/1991 | (WO) . |
| WO96/38235 | 12/1996 | (WO) . |
| WO97/47401 | 12/1997 | (WO) . |
| WO97/47402 | 12/1997 | (WO) . |
| WO98/07527 | 2/1998 | (WO) . |
| WO99/06158 | 2/1999 | (WO) . |
| 96/4394 | 5/1996 | (ZA) . |
| 96/4395 | 5/1996 | (ZA) . |

OTHER PUBLICATIONS

"Conductive primers and other EDP advances" by S. E. Stromberg, Industrial Finishing.

Journal of the American Chemical Society, vol. 49, pp. 3181 (1927).

Advances in Polyurethane Technology, Buist et al, pp. 88, 1968.

Beck et al., *Makromol. Chem., Macromol. Symp. 8*, "Electrocoagulation of Waterborne Polymers in the Presence of Carbon Black", 1987, pp. 285–322.

Products Finishing, *Focus: Electrodeposition of Paint*, "Two–Coat Electrocoat", M. Todd, Oct. 1992, pp. 54–59.

*Industrial Finishing*, "Conductive Primers and Other EDP Advances", Stromberg.

*Electrocoat '92 Conference—Focusing on the Electrodeposition of Paint*, "Two–Coat Electrocoat as Applied to Distribution Transformers", M. Todd, Mar. 1992.

*Electrocoat '96® Conference—The Environomic Solution*, "Paint Innovations, Two–Coat Electrocoat", D. Knudtson, Mar. 1996, pp. 19–1 through 19–15.

*Industrial Paint & Powder*, "Two–Coat E–coat Doubles Durability", T. Triplett, 1997.

*Electrocoat '98—The Environomic Solution*, Why Double Electrocoat and Powder?, T. Hager, pp. 18–1 through 18–11.

*Volume 2: Finished Products*, "Outlines of Paint Technology", W. M. Morgans, pp. 116–119.

"The Chemistry of Silica", R. K. Iler, 1979, pp. 412–414.

*Paint & Ink International*, "Latest Trends in Electrodeposition Paints", R. D. Kanolkar, 1995, pp. 4, 6–7.

"Mehrfach–Elektrotauchlackierung mit Hilfe von rußgefüllten Systemen", Streitberger et al., pp. 177–189.

Automotive Finishes (slide); presentation by PPG Industries, Inc.

PPG Power Prime® Technical Bulletin, Two–Coat Protection, The Primer–Surfacer Alternative.

Copies of overhead projector slides re: "Six" and "Seven Year Technology", Jan. 17, 1992 (Exhibit 1).

PPG Chrysler Electrocoat Development Update Meeting Report by M. Mulligan (Exhibit 2).

Material—Konzept by Mercedes Benz (1994) discussing PPG's DuoPrime process.

Results of Delamination Tests. Jul. 14, 1994 (Exhibit 3).

Technical Update to General Motors by PPG—A "Common" Focus (Sep. 24, 1994) (Exhibit 4).

Chrysler Technical Update by PPG, Oct. 26–27, 1994 (Exhibit 5).

Transcription of Chrysler Technical Update, Oct. 26–27, 1994 (Exhibit 5).

GM Electrocoat Technical Review slides, Nov. 24, 1994 (Exhibit 6).

Memo Confirming the Meeting with GM on Nov. 22, 1994 and lists the attendees from GM, dated Dec. 1994 (Exhibit 6).

*Proceedings of the 1991 IEEE Power Engineering Society—Transmission and Distribution Conference*, "Application of Two Coat Cathodic Electrodeposition to Pole Mounted Distribution Transformers", M. Todd, pp. 582–585.

Technical Update to Ford, Feb. 9, 1995 (Exhibit 7).

General Motors Technology Update, Feb. 1995 (Exhibit 8).

Letter from Matthew Plaza of PPG to Ford Motor Company confirming meeting of Mar. 22, 1995 (Mar. 16, 1996) (Exhibit 9).

Letter from Ford's representative to PPG personnel re: Minutes of PPG–Ford Chip Dip Meeting on Mar. 22, 1995 (Apr. 26, 1995) (Exhibit 10).

Redacted Internal PPG Correspondence dated Apr. 18, 1995 re: GM Electrocoat Update, (Exhibit 11).

Allowed claims for EP 0839073 (Appln. No. 96919803.5).

\* cited by examiner

PROCESS FOR FORMING A TWO-COAT ELECTRODEPOSITED COMPOSITE COATING THE COMPOSITE COATING AND CHIP RESISTANT ELECTRODEPOSITED COATING COMPOSITION

CROSS-REFERENCE TO RELATED APPLICATIONS

This application claims the benefit of U.S. Provisional Applications Ser. Nos. 60/086,693 and 60/086,707, filed May 26, 1998, which are hereby incorporated by reference.

BACKGROUND

The present invention is directed to a process for electrodepositing a two-coat composite coating on a substrate where the first electrodeposited coating protects against corrosion and the second electrodeposited coating protects against chipping of the coated composite.

Multilayered coating composites find use in various industries including the coating and/or painting of various motor vehicles. In several of these industries and in the automotive industry in particular there can be from 2 up to 6 or more coating layers in the multilayered coating composites. These coating layers can serve to protect the substrate and/or to provide a decorative finish.

Multilayered coating composites for metal substrates like those in the automobile industry have involved electrodeposition coatings as an initial resinous coating layer to protect the metal substrate from corrosion. Cationic electrodeposition coatings have become the coatings of choice for corrosion protection. Electrodeposition has become increasingly important in the coatings industry because by comparison with non-electrophoretic coating means, electrodeposition offers higher paint utilization, outstanding corrosion protection, low environmental contamination, and a highly automated process.

Two-coat application by the electrodeposition process is known in the art. For example in U.S. Pat. Nos. 4,988,420; 4,840,715; and 5,275,707 different types of electroconductive pigments are added to a first electrodeposited acrylic resinous coating, and a second electrodeposition coating is applied over the conductive first electrodeposited acrylic coating. Typically, these second electrodeposition coatings have been applied for durability and decorative purposes.

Also in multilayered coating composites for motor vehicles another coating layer that can be present is a spray applied chip resistant coating layer. Such a layer protects the surface of the substrates from losing paint through chipping when the substrate of the vehicle is hit with solid debris such as gravel and stones. The art for achieving chip resistance from spray applied primer coatings has postulated that reducing the differential in impact energy between multiple coating layers should improve chip resistance of the coating. This is especially the situation for those coating layers with excessive difference of hardness between them. This reduction in the differential would lessen delamination between the coatings such as between the undercoat and an intermediate coat and a top coat or an undercoat and an intermediate coat.

In U.S. Pat. No. 5,674,560, this differential is reduced through a chip resistant polyolefin type of primer that is spray applied over a cationic or anionic electrodeposited coated film before application of a soft intermediate polyester film. The reduction of the differential in impact energy is reportedly maximized when the polyolefin primer is applied over the softer anionic electrodeposited film as opposed to a cationic electrodeposited film.

Therefore, even though the art recognizes that cationic electrodeposited coatings provide better corrosion resistance than anionic electrodeposited coatings, further improvements in chip resistance in a multilayered coating system may be at odds with or involve sacrificing some corrosion resistance by using the anionic electrodeposited coating for corrosion protection.

An object of the present invention is to provide a process and system for the improved multiple coatings with both good chip resistance and corrosion protection while additionally providing efficiencies in application and processing. These include higher paint utilization, low environmental contamination, and a highly automated process.

SUMMARY OF THnE INVENTION

The present invention provides a process of electrocoating electrically conductive substrates with two electrodeposited layers, comprising the steps of:

(a) electrodepositing on the substrate an electrically conductive coating that is deposited from a composition comprising a curable ionic resin and an electrically conductive pigment;

(b) at least partially curing the electrodeposited coating so as to make the coating electrically conductive;

(c) electrodepositing a second coating on the electrically conductive coating from step (b); the second coating being deposited from a composition comprising a curable ionic polyurethane resin that contains a polymeric segment derived from an active hydrogen-containing polymer having a glass transition temperature of 0° C. or less and a number average molecular weight of 400 to 4000;

(d) curing the second coating from step (c).

An article coated by the process of the invention is also provided.

Also provided is an aqueous electrodepositable composition comprising a curable polyurethane resin containing ionic salt groups dispersed in an aqueous medium which is the reaction product of:

(a) a polyisocyanate and (b) an active hydrogen-containing polymer having a glass transition temperature of 0° C. or less and a number average molecular weight of 400 to 4000.

DETAILED DESCRIFION OF THE INVENTION

The use of numerical values in the various ranges specified in this application, unless expressly indicated otherwise, are stated as approximations as though the minimum and maximum values within the stated ranges were both preceded by the word "about". In this manner slight variations above and below the stated ranges can be used to achieve substantially the same results as values within the ranges. Also, the disclosure of these ranges is intended as a continuous range including every value between the minimum and maximum values.

The first step in the process of the invention is electrodepositing an electrically conductive coating onto the surface of an electrically conductive substrate. The coating is deposited from a composition comprising a curable ionic resin and an electrically conductive pigment. The composition may be an anionic electrodepositable composition or a cationic electrodepositable composition, which is preferred. The anionic and cationic electrodepositable compositions which can be used are those which provide high throwpower and good corrosion resistance. These compositions are well known in the art.

Examples of ionic resins suitable for use in anionic electrodepositable coating compositions are base-solubilized, carboxylic acid containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxyalkyl esters of unsaturated carboxylic acids, unsaturated carboxylic acid and at least one other ethylenically unsaturated monomer. Still another suitable electrodepositable resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, lines 1 to 75 and col. 10, lines 1 to 13, all of which are herein incorporated by reference. Other acid functional polymers can also be used such as phosphatized polyepoxide or phosphatized acrylic polymers as are well known to those skilled in the art.

Examples of ionic resins suitable for use in cationic electrodepositable coating compositions include amine salt group-containing resins such as the acid-solubilized reaction products of polyepoxides and primary or secondary amines such as those described in U.S. Pat. Nos. 3,663,389; 3,984, 299; 3,947,338; and 3,947,339. Usually, these amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins such as those described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine salt. Such resins are described in U.S. Pat. Nos. 3,962,165; 3,975,346; and 4,001,101. Examples of other cationic resins are ternary sulfonium salt group-containing resins and quaternary phosphonium salt-group containing resins such as those described in U.S. Pat. Nos. 3,793,278 and 3,984,922, respectively. Also, film-forming resins which cure via transesterification such as described in European Application No. 12463 can be used. Further, cationic compositions prepared from Mannich bases such as described in U.S. Pat. No. 4,134,932 can be used.

The resins to which the present invention is particularly effective are those positively charged resins which contain primary and/or secondary amine groups. Such resins are described in U.S. Pat. Nos. 3,663,389; 3,947,339; and 4,116, 900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when polyepoxide is reacted with excess polyamines such as diethylenetriamnine and triethylenetetraamine and the excess polyamine vacuum stripped from the reaction mixture. Such products are described in U.S. Pat. Nos. 3,663,389 and 5 4,116,900.

Electrodepositable compositions such as disclosed in U.S. Pat. No. 5,767,191 containing oleic acid and abietic acid and U.S. Pat. No. 4,891,1 11 containing alkylated polyether are preferred.

The ionic electrodepositable resin described above is present in the electrocoating composition in amounts of about 1 to about 60 percent by weight, preferably about 5 to about 25 based on total weight of the electrodeposition bath.

The electrocoating compositions are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually from about 2 to about 60 percent by weight based on total weight of the aqueous dispersion.

The ionic electrodepositable compositions contain an electroconductive pigment to make the resultant coating electroconductive. Suitable electroconductive pigments include electrically conductive carbon black pigments. Generally the carbon blacks can be any one or a blend of carbon blacks ranging from those that are known as higher conductive carbon blacks, i.e. those with a BET surface area greater than 500 m$^2$/gram and DBP adsorption number (determined in accordance with ASTM D2414-93) of 200 to 600 ml/100 g. to those with lower DBP numbers on the order of 30 to 120 ml/100 gram such as those with DBP numbers of 40 to 80 ml/100 grams.

Examples of commercially available carbon blacks include Cabot Monarch™ 1300, Cabot XC-72R, Black Pearls 2000 and Vulcan XC 72 sold by Cabot Corporation; Acheson Electrodag™ 230 sold by Acheson Colloids Co.; Columbian Raven™ 3500 sold by Columbian Carbon Co.; and Printex™ XE 2, Printex 200, Printex L and Printex L6 sold by DeGussa Corporation, Pigments Group. Suitable carbon blacks are also described in U.S. Pat No. 5,733,962.

Also, electrically conductive silica pigments may be used. Examples include "Aerosil 200" sold by Japan Aerosil Co., Ltd., and "Syloid 161", "Syloid 244", "Syloid 308", "Syloid 404" and "Syloid 978" made by Fuji Davison Co., Ltd.

Mixtures of different electroconductive pigments can be used.

The amount of electroconductive pigment in the electrodepositable composition can vary depending on specific type of pigment that is used, but the level needs to be effective to provide an electrodeposited coating with a conductivity of greater than or equal to $10^{-12}$ mhos/cm. Stated another way the electrodeposited coating should have a resistivity of less than or equal to $10^{12}$ ohms-cm., preferably a resistance of less than or equal to $10^8$ ohms at typical film builds or thicknesses for electrodeposited coatings. This level is necessary so that upon curing or partial curing the coating becomes electroconductive. Preferably, curing is by heating at a temperature of at least 120° C. (248° F.). Typically, the electroconductive pigment content in the electrodepositable composition is from 5 to 25 percent by weight based on total solids of the electrodeposition composition.

Most electroconductive substrates, especially metal substrates such as steel, zinc, aluminum, copper, magnesium, or the like and galvanized metals such as any galvanized steels and the like whether hot dip galvanized or electrogalvanized or other galvanizing method can be coated with the electrodepositable compositions. Steel substrates are preferred. It is customary to pretreat the substrate with a phosphate conversion coating, usually a zinc phosphate conversion coating, followed by a rinse which seals the conversion coating. Pretreatments are well known to those skilled in the art. Examples of suitable pretreatment compositions are disclosed in U.S. Pat. Nos. 4,793,867 and 5,588,989.

In the process of applying the electrically conductive coating, the aqueous dispersion of the electrodepositable composition is placed in contact with an electrically conductive anode and cathode. Upon passage of an electric current between the anode and cathode, an adherent fihn of the electrodepositable composition will deposit in a substantially continuous manner on either the anode or the cathode depending on whether the composition is anionically or cationically electrodepositable. Electrodeposition is usually carried out at a constant voltage in the range of from about 1 volt to several thousand volts, typically between 50 and 500 volts. Current density is usually between about 1 .0 ampere and 15 amperes per square foot (10.8 to 161.5 amperes per square meter).

After electrodeposition, the coating is at least partially cured, typically by heating. Temperatures usually range from 200° F. to 400° F. (93.3° C. to 204.4° C.), preferably from 300° F. to 375° F. (149° to 191° C.) for a period of time ranging from 10 to 60 minutes. The thickness of the resultant film is usually from about 10 to 50 microns.

The heating or baking of the electrodeposited coating can also be performed by means of infrared radiation ("IR"). Generally, there are three categories of IR. These categories are: near-IR (short wavelength) having a peak wavelength from 0.75 to 2.5 microns ("u") (750 to 2500 nanometers); intermediate-IR (medium wavelength) having a peak wavelength from 2.5 to 4 u (2500 to 4000 nanometers), and far-IR (long wavelength) having a peak wavelength from 4 to 1000 u (4000 to 100,000 nanometers). Any or any combination or all of these categories of IR can be used for the heating to at least partially cure the coating.

Curing can be done in a selective manner. At least one predetermined area of the first electrodeposited coating composition is selectively heated by IR, for example, the exterior surfaces of an automobile body, where such predetermined area is to be coated with the second electrodepositable coating composition. The interior surfaces of the electrocoated substrate are not exposed to the IR and as a result, the first electrocoat coating is not cured on the interior surfaces and does not become electroconductive. Hence the deposition of the second electrodeposited coating layer is only on the exterior surfaces which are electrically conductive. With this treatment, substrates like an automobile body have the cured, conductive, first electrodeposited coating on exterior surfaces and the uncured, nonconductive, first electrodeposited coating on interior surfaces. Upon application of the second electrodeposited coating and curing of both electrodeposited coatings, the exterior surface of the automobile body will have both the first and second electrodeposited coatings and good corrosion and chip resistance where it is needed most. The interior surface will only have the first electrodeposited coating and corrosion resistance but no chip resistance. Since the interior surfaces will not be exposed to road debris, chip resistance is not needed.

When IR heating is used with complex shapes such as automobile bodies, it is preferable to dry the substrate coated with the first electrodeposited coating composition for 2 to 20 minutes, in a standard oven such as a convection, electric, or gas fired oven before exposing the electrocoated substrate to IR. The drying step can be at a temperature sufficient to remove water but not sufficient to cure the coating such that it becomes conductive. Generally the temperature is less than 120° C.

IR heating can be conducted from 10 seconds to 2 hours, usually from 5 to 20 minutes. Temperatures range from greater than 120° C. to 220° C. (248° F. to 428° F.) and preferably from 130° C. to 190° C. (266° F. to 374° F.).

After application of the electroconductive coating, a second coating is electrodeposited over the first coating. The second coating is deposited from a composition comprising a curable ionic polyurethane resin that contains a polymeric segment derived from an active hydrogen-containing polymer having a glass transition temperature of 0° C. or less and a number average molecular weight of 400–4000. When the first electrodeposited coating provides corrosion resistance, the second electrodeposited coating provides chip resistance. The ionic polyurethane resin can be anionic or cationic, but preferably is cationic and the composition is cationically electrodepositable. The polyurethane will have a molecular weight ($M_z$) of less than 100,000, preferably less than 50,000 and most preferably from 10,000 to 40,000. The polyurethane also has active hydrogen functionality, i.e., hydroxyl, primary or secondary amine, and typically has an active hydrogen equivalent weight of 800 to 2500 grams per equivalent.

By the term "polyurethane", as used herein, the meaning is intended to include polyurethanes as well as polyureas, and poly(urethane-ureas).

The molecular weight of the polyurethane and other polymeric materials used in the practice of the invention is determined by gel permeation chromatography using a polystyrene standard.

Suitable polyisocyanates used for preparing the polyurethanes include those that have aliphatically, cycloaliphatically, aral6phatically, and/or aromatically bound isocyanate groups. Preferably, the polyisocyanate is aliphatic or cycloaliphatic.

Examples of aliphatic and cycloaliphatic polyisocyanates include 4,4-methylene-bisdicyclohexyl diisocyanate (hydrogenated MDI), hexamethylene diisocyanate (HDI), isophorone diisocyanate (IPDI), methylenebis(cyclohexyl isocyanate) and cyclohexylene diisocyanate (hydrogenated XDI).

Examples of aromatic polyisocyanates include tolylene diisocyanate (TDI) (i.e., 2,4-tolylene diisocyanate, 2,6-tolylene diisocyanate or a mixture thereof), diphenylmethane-4,4-diisocyanate (MDI), naphthalene-1,5-diisocyanate (NDI), 3,3-dimethyl-4,4-biphenylene diisocyanate (TODI), crude TDI (i.e., a mixture of TDI and an oligomer thereof), polymethylenepolyphenyl polyisocyanate, crude MDI (i.e., a mixture of MDI and an oligomer thereof), xylylene diisocyanate (XDJ) and phenylene diisocyanate.

Polyisocyanate derivatives prepared from hexamethylene diisocyanate, 1-isocyanato-3,3,5-trimethyl-5-isocyanatomethylcyclohexane ("IPDI"), including isocyanurates thereof, and/or 4,4'-bis(isocyanatocyclohexyl) methane are suitable.

The amount of polyisocyanate used to make the polyurethanes is typically from 10 to 60, preferably 20 to 50 percent by weight based on total weight of the reactants used to make the polyurethane.

The active hydrogen-containing material for reaction with the polyisocyanate to form the cationic or anionic polyurethane comprises one or more active hydrogen-containing polymers. These materials preferably have an average active hydrogen functionality ranging from about 2 to 8, preferably from about 2 to 4, and a number average molecular weight ranging preferably from about 400 to 10,000, more preferably from 400 to 4,000, and a glass transition temperature (Tg) of 0° C. or less. Polyether polyols are preferred.

The term "active hydrogen" means those groups which are reactive with isocyanates as determined by the Zerewitnoff test as is described in the JOURNAL OF THE AMERICAN CHEMICAL SOCIETY, Vol. 49, page 3181 (1927). Preferably, the active hydrogens are hydroxyl, primary amine and secondary amine. The Tg for many polyethers are available in the literature. Also helpful in determining the Tg is the Clash-Berg method, described in *Advances in Polyurethane Technology*, Burst et al., Wiley & Sons, 1968, pages 88ff.

Examples of polyether polyols are polyalkylene ether polyols which include those having the following structural formula:

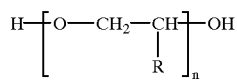

where the substituent R is hydrogen or lower alkyl containing from 1 to 5 carbon atoms including mixed substituents, and n is typically from 5 to 200. Included are poly (oxytetramethylene) glycols, poly(oxyethylene) glycols, poly(oxy-1,2-propylene) glycols and the reaction products of ethylene glycol with a mixture of 1,2-propylene oxide and ethylene oxide. These materials are obtained by the polymerization of alkylene oxides such as ethylene oxide, propylene oxide and tetrahydrofuran.

Also, polyethers obtained from the oxyalkylation of various polyols, for example, diols such as 1,6-hexanediol or higher polyols such as trimethylolpropane and sorbitol can be used. One commonly utilized oxyalkylation method is by reacting a polyol with alkylene oxide such as ethylene or propylene oxide in the presence of an acidic or basic catalyst.

Examples of other active hydrogen-containing polyethers are polyoxyalkylenepolyamines. The preferred polyoxyalkylenepolyamines are those of the structure:

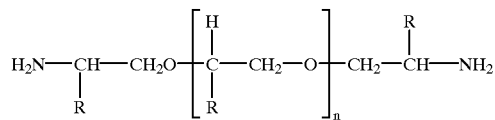

wherein R can be the same or different and is selected from the class consisting of hydrogen, lower alkyl radicals having from 1 to 6 carbon atoms, and n represents an integer of from about 1 to 50, preferably 1 to 35. A number of such polyoxyalkylenepolyamines are described in more detail in U.S. Pat. No. 3,236,895, column 2, lines 40–72; methods of preparation of the polyoxyalkylenepolyamines are illustrated in the patent in Examples 4, 5, 6 and 8–12 in columns 4 to 9 thereof; the aforementioned portions of U.S. Pat. No. 3,236,895 hereby being incorporated by reference.

Mixed polyoxyalkylenepolyamines can be used, that is, those in which the oxyalkylene group can be selected from more than one moiety. Examples would be mixed polyoxyethylene-propylenepolyamines such as those having the following structural formula:

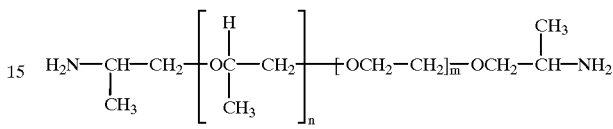

wherein n+m is equal to 1 to 50, preferably 1 to 35, m is equal to 1 to 49, preferably 1 to 34, and n is equal to 1 to 34.

Besides the polyoxyalkylenepolyamines mentioned above, derivatives of polyoxyalkylenepolyaminies may also be usable. Examples of suitable derivatives would be aminoalkylene derivatives which are prepared by reacting polyoxyalkylenepolyamines such as those mentioned above with acrylonitrile followed by hydrogenation of the reaction product. An example of a suitable derivative would be that of the following structural formula:

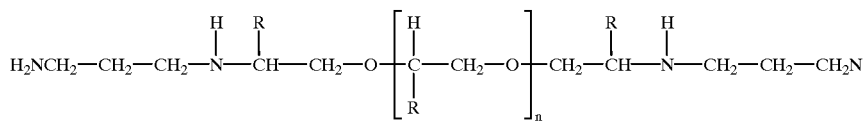

wherein R and n have the meanings mentioned above.

Therefore, in the practice of the invention, where the expression "polyoxyalkylenepolyamines" is used, what is intended are polyamines containing both oxyalkylene groups and at least two amine groups, preferably primary amine groups, per molecule. Primary arnines are considered to be monoflnctional.

The preferred active hydrogen-containing polyethers are polyoxytetramethylene diols, also known as polytetrahydrofuran, and polyoxypropylenediamine or mixed polyoxyethylene-propylenediamnines.

For mixed oxyethylene-propylene groups in the polyether segment, it is preferred that the oxypropylene content be at least 60 weight percent, more preferably at least 70 weight percent, and most preferably at least 80 weight percent of the polyether segment.

The polyefter segment can be derived from a single polyether polyol or polyamine or various blends thereof. Preferred are blends of polyether polyols such as polyoxytetramethylene diol and polyether polyamines such as polyoxypropylenediamine in weight ratios of 0.5–10:1, preferably 1 to 7:1.

Besides active hydrogen-containing polyethers, other active hydrogen-containing materials can be reacted with the polyisocyanate to provide the soft segment. Examples include polycarbonate diols, polyester diols, hydroxyl-containing polydiene polymers, hydroxyl-containing acrylic polymers, and mixtures thereof.

Examples of polyester polyols and hydroxyl containing acrylic polymers are described in U.S. Pat. Nos. 3,962,522 and 4,034,017, respectively. Examples of polycarbonate polyols are described in U.S. Pat. No. 4,692,383 in col. 1, line 58 to col. 4, line 14. Examples of hydroxyl-containing polydiene polymers are disclosed in U.S. Pat. No. 5,863,646, col. 2, lines 11–54. These polymeric polyols will have number average molecular weights of from 400 to 10,000.

The amount of the active hydrogen-containing polymer which is used to prepare the polyurethane is at least 30, preferably at least 35, and more preferably from 35 to 50 percent by weight based on total weight of the reactants used to make the polyurethane. Low molecular weight polyols such as those having two to four hydroxyl groups and molecular weights of less than 400, preferably less than 250 and usually between 62 and 250 can also be included as reactants for preparing the polyurethane. Specific examples include alkylene diols having 1 to 10 carbon atoms such as ethylene glycol, 1,2-propylene glycol, 1,4-butanediol, trimethylolpropane, glycerol, pentaerythritol and sorbitol. Examples of other low molecular weight polyols are ether polyols such as diethylene glycol and ethoxylated bisphenol A.

The low molecular weight polyols are used in amounts up to 30 percent by weight, preferably from 0.5 to 10 percent by weight based on weight of the reactants used to make the polyurethane.

The prepolymer also has ionizable groups which can be ionized for solubilizing the polymer in water. For the purposes of this invention, the term "ionizable" means a group capable of becoming ionic, i.e., capable of dissociating into ions or becoming electrically charged.

For the cationic polyurethanes, the ionizable moiety is typically a tertiary amine group which can be incorporated into the polyurethane by reaction with an active hydrogen-containing compound. The amine is neutralized with acid to form the amine salt groups. Such compounds include aminoalcohols such as dimethylaminoethanol, dimethylaminopropanol, aminopropyldiethanolamine, diethylaminopropylamine, hydroxyalkylmorpholine like hydroxyethylmorpholine, and hydroxyalkylpiperazine like hydroxyethylpiperazine, and the like and mixtures thereof. The amount of amine introduced into the polymer typically is that sufficient to give 0.1 to 1, preferably 0.2 to 0.5 milliequivalents (meqs) of amine per gram of resin solids as determined by titration.

For the anionic polyurethane, the ionizable moiety is an acid group which typically is incorporated into the polyurethane by reaction with an active hydrogen-containing compound. The acid is neutralized with base to form the carboxylate salt group. Examples of anionic groups are $-OSO_3^-$, $-COO^-$, $-OPO_3^-$, $-SO_2O^-$, $-POO^-$; and $PO_3^=$, with $COO^-$ being preferred.

Suitable materials for introducing acid groups into the anionic polyurethane are hydroxy and mercapto carboxylic acids. Specific examples include dimethylolpropionic acid, which is preferred, glycolic acid and lactic acid. Other examples of compounds which contain active hydrogens and acid groups are amino carboxylic acids, amino hydroxy carboxylic acids, sulfonic acids, hydroxy sulfonic acids and amino sulfonic acids. Examples include oxaluric acid, anilido acetic acid, glycine, 6-amino-caprylic acid, reaction product of ethanolamine and acrylic acid, hydroxyethylpropionic acid, 2-hydroxy-ethane sulfonic acid and sulphanilic acid. Amino acids must be used in the presence of base such as potassium hydroxide or a tertiary amine. The amount of acid incorporated into the polymer typically is that sufficient to give the polymer 0.1 to 1, preferably 0.2 to 0.5 meqs of acid per gram of resin solids as determined by titration.

The amine or the acid groups are neutralized with acid and base, respectively. Neutralization can range from 0.1 to 1.0, preferably 0.4 to 0.8, of the total theoretical neutralization equivalent.

For the cationic polyurethanes, suitable neutralizing agents are organic acids such as acetic acid, hydroxyacetic acid, propionic acid, lactic acid, formic acid, tartaric acid, sulfamic acid and dimethylolpropionic acid that is preferred, as well as inorganic acids such as sulfuric acid, hydrochloric acid and phosphoric acid.

For anionic polyurethanes, suitable neutralizing agents include inorganic and organic bases such as sodium hydroxide, potassium hydroxide, ammonia and amines. Suitable amines include alkanolamimes such as monoethanolamine, diethanolamine, dimethylaminoethanol, triethanolamine, diisopropanolamine, triisopropanolamine, and the like; alkylamines such as diethylamine, triethylamine, diisopropylamine, tributylamine and the like; trimethylamine, diethylmethylamine, methyldiethanolamine, triethanolamine, and the like. The appropriate amount of the neutralizing agent is about 0.1 to 1.0 times, preferably 0.4 to 0.8 times the total theoretical neutralization equivalent.

To achieve optimum chip resistance and durability, the polyurethane is curable or thermosetting. As such, it is used with a curing or crosslinking agent such as a capped or blocked isocyanate, which is preferred for cationic compositions, or an aminoplast, which is preferred for anionic compositions.

The polyisocyanate may be fully capped with essentially no free isocyanate groups and present as a separate component or it may be partially capped and reacted with hydroxyl or amine groups in the polyurethane backbone. Examples of suitable polyisocyanates and capping agents are those described in U.S. Pat. No. 3,947,339.

When the crosslinking agent contains free isocyanate groups, the film-forming composition is preferably a two-package composition (one package comprising the crosslinking agent and the other comprising the hydroxyl functional polymer) in order to maintain storage stability. Fully capped polyisocyanates are described in U.S. Pat. No. 3,984,299.

The polyisocyanate can be an aliphatic, cycloaliphatic or an aromatic polyisocyanate or a mixture of the two. Diisocyanates are preferred, although higher polyisocyanates can be used in place of or in combination with diisocyanates. Aliphatic or cycloaliphatic polyisocyanates are preferred.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylnethane4,4'-diisocyanate and 2,4- or 2,6-toluene diisocyanate. Examples of suitable higher polyisocyanates are triphenylmethane4,4', 4"-triisocyanate, 1,2,4-benzene triisocyanate and polymethylene polyphenyl isocyanate. Biurets and isocyanurates of diisocyanates, including mixtures thereof, such as the isocyanurate of hexamethylene diisocyanate, the biuret of hexamnethylene diisocyanate, and the isocyanurate of isophorone diisocyanate are also suitable.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

Any suitable aliphatic, cycloaliphatic, or aromatic alkyl monoalcohol or phenolic compound may be used as a capping agent for the capped polyisocyanate crosslinking agent in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether.

Other suitable capping agents include oximes such as methyl ethyl ketoxime, acetone oxime and cyclohexanone oxime, lactams such as epsilon-caprolactam, and amines such as dibutyl amine.

The crosslinking agent is typically present in the thermosetting compositions of the present invention in an amount of at least 10 percent by weight, preferably at least 15 percent by weight, based on total resin solids weight of the composition. The crosslinking agent is also typically present in the composition in an amount of less than 60 percent by weight, preferably less than 50 percent by weight, and more preferably less than 40 percent by weight, based on total resin solids weight of the composition. The amount of crosslinking agent present in the thermosetting composition of the present invention may range between any combination of these values, inclusive of the recited values.

The equivalent ratio of hydroxyl groups in the polymer to reactive functional groups in the crosslinking agent is typically within the range of 1:0.5 to 1.5, preferably 1.0 to 1.5.

Aminoplasts are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol, isobutanol, and hexanol.

Preferably, the aminoplasts which are used are melamine-, urea-, glycouril or benzoguanamine-formaldehyde condensates etherified with an alcohol containing from one to four carbon atoms.

The aminoplast is present in the electrodepositable composition in amounts of 5 to 60, preferably 15 to 50 percent by weight based on weight of resin solids.

Usually the thermosetting composition will also preferably contain catalysts to accelerate the cure of the crosslinking agent with reactive groups on the polymer(s). Suitable catalysts for aminoplast cure include acids such as acid phosphates and sulfonic acid or a substituted sulfonic acid. Examples include dodecylbenzene sulfonic acid, paratoluene sulfonic acid, and the like. Suitable catalysts for isocyanate cure include organotin compounds such as dibutyltin oxide, dioctyltin oxide, dibutyltin dilaurate, and the like. The catalyst is usually present in an amount of about 0.05 to about 5.0 percent by weight, preferably about 0.08 to about 2.0 percent by weight, based on the total weight of resin solids in the thermosetting composition.

Optional ingredients such as pigments can be present in the polyurethane compositions. Particularly suitable pigments include hiding pigments such as titanium dioxide, zinc oxide, antimony oxide, etc. and organic or inorganic UV opacifying pigments such as iron oxide, transparent red or yellow iron oxide, carbon black, phthalocyanine blue, and the like. Pigments can be present in amounts of up to 35 parts by weight or less based on 100 parts by weight of total solids of the electrodepositable composition.

Other optional ingredients are anti-oxidants, UV- absorbers and hindered amine light stabilizers, such as for example, hindered phenols, benzophenones, benzotriazoles, triazoles, triazines, benzoates, piperidinyl compounds and mixtures thereof. These ingredients are typically added in amounts up to about 2% based on the total weight of resin solids of the electrodepositable composition. Other optional ingredients include co-solvents, coalescing aids, defoamers, plasticizers, bactericides and the like.

The aqueous cationic or anionic polyurethane dispersions are typically electrodeposited on the electroconductive coating from an electrodeposition bath having a solids content of 5 to 50 percent by weight. The bath temperature is usually about 15° C. to 35° C. The voltage is from 100 to 400 V (load voltage) using the substrate with the electroconductive coating as a cathode in the case of the cationic polyurethane or as an anode in the case of the anionic polyurethane. The film thickness of the electrodeposited coating is not particularly restricted and can vary largely depending upon the application of finished product, etc. However, the thickness is usually between 3 to 70 microns, particularly 15 to 35 microns in terms of cured film thickness. The baking and curing temperature of the coating film is usually from 100° C. to 250° C. and preferably 140° C. to 200° C. As mentioned above in the case of the selective application of the second electrocoat through use of the IR bake of the first electrodeposited coating, the heating or baking after application of the second electrocoat can cure both the first and second electrocoats on surfaces not exposed to IR heating or baking. Also, the baking can complete the cure of the first electrocoat that was exposed to IR and overcoated with the second electrocoat.

EXAMPLES

An cationic electrodepositable composition for corrosion protection which results in a conductive coating for a substrate was prepared from the below-described materials in Example 1. These included the blocked polyisocyanate crosslinker prepared according to Example 1A, and the cationic electrodepositable primer resin that along with the blocked polyisocyanate makes up the main vehicle of the composition prepared in Example 1B. The cationic electrodepositable composition was prepared according to Example 1C.

Example 1 Part A: Isocyanate Crosslinker

A blocked polyisocyanate crosslinker was prepared from the following materials:

| Material | Parts by weight |
|---|---|
| Polyisocyanate[1] | 1320.00 |
| Methyl isobutyl ketone | 369.18 |
| Trimethylol propane | 89.46 |
| Dibutyltin dilaurate | 1.0 |
| 2-(2-Butoxyethoxy)ethanol | 1297.84 |

[1]Polymeric MDI available from DOW CHEMICAL Company, Michigan under the trade designation of PAPI 2940.

The polyisocyanate and methyl isobutyl ketone were charged to a reaction flask under a nitrogen atmosphere and heated to 80° C. Trimethylol propane then was added and the mixture heated to 105° C. and held for 30 minutes. The mixture was cooled to 65° C. and dibutyltin dilaurate and 2-(2-butoxyethoxy)ethanol were added slowly allowing the reaction to exotherm to a temperature between 80 to 110° C. and held there until Infrared analysis indicated no unreacted NCO remained.

Example 1 Part B: Cationic Primer Electrodeposition Vehicle

A cationic aqueous main vehicle was prepared from the following materials. All parts and percentages are by weight unless otherwise indicated.

| Material | Parts by weight |
|---|---|
| EPON 828[2] | 1864.07 |
| Bisphenol A-ethylene oxide adduct (1/6 molar ratio)[3] | 750.00 |
| Bisphenol A | 776.23 |
| Methyl isobutyl ketone | 109.09 |
| Ethyltriphenyl phosphonium iodide | 1.8 |
| Crosslinker from Ex. 1A | 2859.26 |
| Diketimine[4] | 110.66 |
| N-methyl ethanolamine | 199.48 |

[2]Polyglycidyl ether of Bisphenol A, available from Shell Oil and Chemical Co., Houston Texas.
[3]Prepared with materials in accordance with U.S. Pat. No. 4,468,307 (Wismer et. al.)
[4]Diketimine derived from diethylenetriamine and methyl isobutyl ketone (73% solids in methyl isobutyl ketone).

The EPON 828, bisphenol A-ethylene oxide adduct, bisphenol A and methyl isobutyl ketone were charged to a reaction vessel and heated under a nitrogen atmosphere to 125° C. Ethyl triphenyl phosphonium iodide was added and the reaction mixture was allowed to exotherm to about 145° C. The reaction was held at a temperature of 145° C. for two hours and an epoxy equivalent was obtained. Epoxy equivalent usually stalls close to the target epoxy equivalent weight. At this point, the crosslinker, the diketimine and N-methyethanolamine were added in succession. The mixture was allowed to exotherm and then a temperature of 130° C. was established and the mixture was held for one hour at 130° C. The resin mixture (6000 parts) was dispersed in aqueous medium by adding it to a mixture of 154.62 parts of sulfamic acid and 3339.88 parts of deionized water. After stirring for 30 minutes, Emersol 210 oleic acid in an amount of 55.20 parts was added and the dispersion stirred for 30 minutes more. Emersol 210 is available from Henkel Corp. Emery Division, Cincinnati, Ohio. The dispersion was further thinned with 1909.94 parts of deionized water, 1273.29 parts of deionized water and 2345.54 parts of deionized water in stages and vacuum stripped to remove organic solvent to give a dispersion having a solids content of 44.78 percent and a particle size of 860 Angstroms.

Example 1 Part C: Preparation of Cationic Electrocoat Primer

A cationic electrodeposition coating was prepared from the following materials. All parts and percentages are by weight unless otherwise indicated.

| Material | Parts by Weight |
|---|---|
| Main Vehicle from Ex. 1B | 1281.6 |
| Co-Resin[5] | 120.3 |
| Surfactant[6] | 2.5 |
| Pigment Paste[7] | 589.2 |
| Deionized Water | 1806.4 |
| Total | 3800.0 |

[5]An aqueous dispersion of a flexibilizer-flow control agent generally in accordance with U.S. Pat. No. 4,423,166 was prepared for use with the electrodepositable composition. The flexibilizer-flow control agent was prepared from a polyepoxide (EPON828) and a polyoxyalkylene-polyamine (JEFFAMINE D-2000 available from Huntsman Corporation, Salt Lake City, Utah..). The flexibilizer-flow control agent was dispersed in aqueous medium with the aid of lactic acid and the dispersion had a resin solids content of 36.0 percent.
[6]A Surfactant blend (85-XS-139) available from Air Products and Chemicals, Inc., Allentown, Pennsylvania.
[7]A cationic pigment paste (CP639) having an electroconductive carbon black pigment available from PPG Industries, Inc., Pittsburgh, Pennsylvania.

The cationic electrodepositable coating composition was prepared by adding the components in the order listed to a bath-type container for the coating of panels. The deposition of the composition involved immersing a zinc phosphated steel, a zinc phosphated electrogalvanized, and a zinc phosphated zinc-iron alloy panel in the bath and individually electrocoating the panels at 180 volts for two minutes at 95° F. (35° C.) in order to produce baked film builds of about 0.75 mil (19.0 microns). The electrocoated panels were baked 30 minutes at 365° F. (185° C.).

Several chip resistant thermosetting polyurethane electrodepositable coating compositions were prepared as shown in the following Examples.

Example 2: Part A—Preparation of Anionic Polurethane Resins

Anionic polyurethane resins were prepared from the materials listed in Table 1. All parts and percentages are by weight unless otherwise indicated.

TABLE 1

| | All PolyTHF[8] I | Blend of polyTHF and Jeffamine II | All polyPPO[9] III |
|---|---|---|---|
| Polymeg 1000[10] | 53.34 | 34.66 | — |
| Niax 1025[11] polypropyleneglycol | — | — | 34.77 |
| Isophoronediisocyanate | 31.77 | 33.54 | 33.41 |
| Jeffamine D-2000 | — | 8.02 | 7.99 |
| propoxylated trimethylolpropane[12] (pTMP) | — | 12.97 | 12.89 |

TABLE 1-continued

|  | All PolyTHF[8] I | Blend of polyTHF and Jeffamine II | All polyPPO[9] III |
|---|---|---|---|
| dimethylolpropionic acid | 5.57 | 5.68 | 5.66 |
| trimethylolpropane | 6.05 | — | — |
| propylene glycol | 3.27 | 3.05 | 3.21 |
| 1,4 butanediol | — | 2.08 | 2.08 |
| dibutyltindilaurate | 0.02 | 0.02 | 0.02 |
| methylisobutylketone (MIBK) | 25 | 25 | 25 |
| Total Resin Solids | 100 | 100 | 100 |

[8]polytetrahydrofuran
[9]polypropylene oxide
[10]polytetrahydrofuran, 1,000 molecular weight, available from Great Lakes Chemical, Corp., West Lafayette, Indiana.
[11]polypropylene glycol, 1000 molecular weight, available from Arco Chemical Co. of Newton Square, Pennsylvania as PPG-1025
[12]TS-30 available from Perstorp Polyols, Inc. Toledo, Ohio.

Preparation of Example 21

]sophoronediisocyanate (929.1 g, 8.37 equivalents "eq.,"), dibutyltindilaurate (0.58 grams "g."), and methylisobutyl ketone (145.6 g) were charged to a round bottom flask. The solution was heated to 50° C. At 50° C., Polymeg®1000 PolyTHF (1,535.4 g, 3.07 eq.) and MIEK (402.3 g) were added dropwise at a rate such that the temperature did not exceed reaction was held at 72° C. for 45 minutes after the addition was complete and an isocyanate eq. wt. of 571 was obtained. At 72° C., dimethylolpropionic acid (162.8 g, 2.43 eq. and MIBK (7.5 g) were added and the reaction was held at 90° C. for an isocyanate equivalent weight of 1135. At the anticipated equivalent weight("eq. Wt."), propylene glycol (95.8 g, 2.52 eq.), trimethylolpropane (177 g, 5.21 eq), and MIBK (168.9 g) were added and the reaction was held until no isocyanate remained (as determined by IR).

Generally the polyurethane resins of II and III were prepared in a similar manner to that of I. Exceptions were that for II, Jeffamine D-2000 and pTMP were added rather than the PolyTHF alone. Likewise for example III the polypropylene glycol, Jeffamine D-2000, and pTMP were added and polyTHF was not added. Also for II and Ill, 1,4-butanediol was added in preparing the polyurethane resin.

Example 2: Part B Anionic Pigment Dispersing Resin

The following weight parts were combined:

|  | Material | Amount |
|---|---|---|
| 1 | Polymeg ® 2000 polyTHF[13] | 131.0 |
| 2 | Fomrez ® 55-56[14] polyester | 131.0 |
| 3 | 1-methyl-2-pyrrolidinone | 160.7 |
| 4 | neopentyl glycol | 10.2 |
| 5 | dimethylolpropionic acid | 54.1 |
| 6 | Desmodur ® W[15] polyisocyanate | 235.1 |

[13]poly(tetramethylene ether) glycol, Mw. = 2,000, available from Great Lakes Chemical Corp., West Lafayette, Indiana.
[14]hydroxy terminated polyester, hydroxyl number 56, available from Witco Corporation, Endicot, New York.
[15]methylene-bis-(4-cyclohexyl) diisocyanate, available from Bayer Corporation, Pittsburgh, Pennsylvania.

Materials 1–5 in the order and amounts indicated were charged to a reaction vessel. The mixture was then heated to 54° C. Desmodur®W polyisocyanate and 1-methyl-2-pyrrolidinone (19.0) were then added to the reactor at a rate such that the temperature did not exceed 85° C. After the addition of the polyisocyanate was complete, butanol (2.7) and dibutyltindilaurate (0.6) were added to the reactor. The solution was held at 85 to 90° C. until a stalled isocyanate advancement was achieved (<15 units/hr., theory isocyanate equivalent weight =1,560). After the isocyanate (NCO) advancement stalled, the resin was dispersed into deionized water (992.9), dimethylethanol amine (35.0), and ethylene diamine (15.0) and the dispersion was held at 75° C. for 30 minutes. After the 30-minute hold, the dispersion was cooled to 50° C. At 50° C., deionized water (38.8) and propylene imine (6.5) were added. The dispersion was then heated to 60° C. and held at this temperature for four hours before cooling to room temperature.

Example 2 Part C: Anionic Polyurethane Pigment Paste

Part CI: Preparation of Neutralized Acid Catalyst:

Two neutralized acid catalyst formulations were made. For Example 2 Part CI(1) an amount of 284.93 grams dinonylnaphthalene sulfonic acid Nacure 1051, available as a fifty percent dinonylnaphthalene sulfonic acid in ethyleneglycolmonobutylether, from King Industries of Norwalk, Conn., were mixed with 30.32 grams of dimethylethanolamine. This gives a neutralized acid catalyst intermediate with a calculated solids of 45.19 weight percent. For Example 2 Part CI(2) 60.0 grams of dinonylnaphthalenesulfonic acid solution, Nacure 1051 and 6.68 grams of triethylamine were mixed together and diluted with 511.7 grams of deionized water to give a neutralized catalyst dispersion with a calculated solid of 5.19%.

Part CII: Preparation of Pigment Paste

The following two pigment paste formulations were prepared with the listed materials in amounts as weight parts. These materials were mixed with a Cowles blade and then dispersed with conventional pigment dispersing equipment to a Hegman reading of 7.5+:

|  | CII (1) | CII (2) |
|---|---|---|
| Solvent free acrylic grind resin[16] | — | 212.2 |
| Acid intermediate of Example 2CI (1) | 55.1 | — |
| Anionic Pigment Dispersing Resin of Example 2B | 766.4 | — |
| triethylamine | — | 17.5 |
| Carbon Black[17a(17b)] | 27.9 | 15.5 |
| Titanium Dioxide[18a(18b)] | 634.7 | 634.7 |
| Transparent Red Iron Oxide[19] | 74.6 | 84.9 |
| Phthalo Blue[20] | 9.4 | 10.6 |
| Deionized water | 200 | 480 |

[16]Resin prepared with materials as described in Example A of U.S. Pat. No. 5,530,043 to 100 percent solids.
[17a]Raven 410 and [17b]Raven 1200 both available from Columbian Chemicals Company, Atlanta, Georgia.
[18a]R-900 and [18b]R-960-38 both available from DuPont de Nemours Company, Delaware.
[19]1030-AC-1005 available from Cookson Matthey of Jacksonville, Florida.
[20]248-0061 available from Sun Chemical, Inc., Linden, New Jersey.

For Example CII(1) after dispersion, the dispersing mill was rinsed with a small amount of deionized water. The resulting pigment paste had a measured solids (60 minutes at 110° C.) of 57.3 percent.

Example 2 Part D: Preparation of Electrodepositable THERMOSETTING ANIONIC POLYURETHANE FORMULATIONS The following formulations were made using polyurethane backbones from Example 2 Part A as indicated in Table 2, crosslinkers, and modifiers:

TABLE 2

| | All Poly THF | Blend of polyTHF and Jeffamine | All poly PPO (polypropyleneoxide) | All polyTHF resin plus free PPO triol |
|---|---|---|---|---|
| Formulation | D1 | D2 | D3 | D4 |
| Resin from Example 2A | I | II | III | I |
| Amount of 2A Resin | 268.8 | 268.8 | 268.8 | 237.5 |
| Cymel 1135[21] | 20 | 20 | 20 | 20 |
| Cymel 1123[22] | 15 | 15 | 15 | 15 |
| Polypropyleneoxide triol[23] | — | — | — | 25 |
| dimethylethanolamine | 3.83 | 3.83 | 3.83 | 3.83 |
| deionized water | 550 | 550 | 550 | 550 |
| Amount of flexibilizing segment | 47.2 | 49.2 | 49.2 | 52.0 |
| Ratio Polytetrahydrofuran to polypropylene oxide | ∞ | 1.65/1 | 0 | 4.06 |

[21]methoxy/n-butoxy melamine formaldehyde resins available from Cytec Industries Inc. West Patterson, New Jersey.
[22]methylated ethylated benzoguanamine resins available from Cytec Industries Inc.
[23]LHT-240, 720 molecular weight polypropyleneoxide triol available from Arco Chemical Co. of Newton Square, Pennsylvania.

Formulations D1–D4 were made using the following "hot-mix" procedure: The resin, crosslinkers, and amine were weighed into a quart sized stainless steel beaker, and the beaker placed in a water bath maintained at 80° C. The mixtures were stirred with an air motor and flat pitched propeller blade until homogeneous. Under continuous stirring, 550 grams of deionized water was added slowly to form an aqueous dispersion. After forming the aqueous dispersion, heat to the water bath was turned off, and the mixtures were allowed to cool. The mixtures were transferred to open one gallon plastic containers and stirred overnight with magnetic stirring bars. After stirring overnight to allow most of the ketone solvent to evaporate, an additional 3490 grams of deionized water, along with 75.1 grams of pigment paste from Example 2Part CII(1) were added to complete the electrocoat bath formulations.

The calculation of the amount of flexibilizing segment in Table 2 of Example 2 Part D was determined in the following mainer. The following are summed: polytetrahydrofaran, polyether diols, polyether diamines, polyether plasticizers, and any materials known to impart flexibility to coating films. For the total resins solids, all materials contributing to resin solids are summed, with the proviso that for the Cymel 1123 and Cymel 1135 amine-formaldehyde resins, a weight loss upon curing is estimated. A weight loss for both Cymel 1123 and Cymel 1135 is estimated to be 20%, giving them estimated solids in a baked film of 80%.

As a sample calculation of flexibilizing segment content, the calculation for Formulation D1 is as follows:

| Solid resin materials from resin: | 215 grams |
|---|---|
| Cymel 1135 (20 grams × .8) | 16 grams |
| Cymel 1123 (15 prams × .8) | 12 crams |
| Total | 243 grams |

Flexibilizing segments: 215 grams of resins solids x 53.34% Polymeg 100=114.7 grams of Polymeg 1000. 114.7/243= 47.2% as the amount of flexibilizing segment. The other amounts of flexibilizing segment for the other formulations were calculated in a like manner.

The determination of the weight loss upon curing of amine-formaldehyde resins can depend on many factors such as bake schedule, amount of acid catalysis, and amount of available co-reactants. Nevertheless, but can be estimated from a supplier's reported range of equivalent weight. The equivalent weight of Cymel 1123 is reported to range from 130 to 190 grams per mole of reaction site. The molecular weight of Cymel 1123 benzoguanamine monomer is estimated as 391 by assuming equal moles of the alkylation alcohols, methanol and ethanol. Calculating a weight loss for two moles of methanol yields a calculated weight loss of 15.8%. Calculating a weight loss for two moles of methanol and one mole of ethanol yields a calculated weight loss of 27.4%. The calculations are only rough estimates of how an amine-formaldehyde resin will cure in a particular formulation. An estimate of 20% weight loss is applied to both Cymel 1123 and CYmel 1135 in the examples.

Examples 3 and 4

Two thermosetting anionic polyurethane electrolepositable compositions were prepared from the formulations shown in Table 3 where the amounts of the components are given in weight parts.

TABLE 3

| Charge | Material | Example 3 | Example 4 |
|---|---|---|---|
| 1 | Isophoronediisocyanate | 922.4 | 461.6 |
| 2 | dibutyltindilaurate | 0.55 | 0.28 |
| 3 | MIBK | 253.7 | 90.2 |
| | Hold Temperature ° C. | 70 | 50 |
| 4 | Polymeg 1000 | 953.3 | 586.8 |
| 5 | MIBK | 238.3 | 146.7 |
| 6 | 1,4 butanediol | 57.3 | 12.8 |
| 7 | MIBK | — | 11.3 |
| 8 | Jeffamine D-2000 | 220.5 | 110.3 |
| 8A | MIBK | 15 | 7.5 |
| 9 | dimethylolpropionic acid | 156.3 | 78.9 |
| 10 | MIBK | 127.5 | 7.5 |
| 10A | propylene glycol | 83.9 | 21.8 |
| 11 | propoxylated trimethylolpropane[12] (pTMP) | 356.9 | |
| 11 | trimethylolpropane | — | 125.9 |
| 12 | MIBK | 71.1 | 75 |
| 13 | MIBK held temperature of 93–95° C. | 69.9 | 11.3 |
| 14 | dimethylethanolamine | 52 | |
| 14A | triethylamine | — | 44.6 |

TABLE 3-continued

| Charge | Material | Example 3 | Example 4 |
|---|---|---|---|
| 15 | Paraplex WP-1[24] | | 73.6 |
| 15A | Cymel 1123 | 191.9 | — |
| 16 | Cymel 1135 | 256.2 | — |
| 16A | Cymel 1170 | | 370.1 |
| 17 | deionized water | 2637.4 | 1536.6 |
| 18 | deionized water | 2475.14 | 1180.9 |

[24]propoxylated cresol plasticizer available from C.P. Hall company, Chicago, Illinois.

Preparation of Anionic Polyurethane Formulation Stripped of Solvent

For Examples 3 and 4, the components listed in Table 3 were combined in a similar manner where any difference for Example 4 from Example 3 is indicated in parenthesis in the following description. The isophoronediisocyanate, dibutyltindilaurate, and MIBK were charged to a reaction vessel. The mixture was heated to 70° C. (50° C.) under a nitrogen blanket with agitation. The POLYMEG® 1000, MIBK, 1,4-butanediol and JEFFAMINE® D2000 were added slowly, at a rate that kept the reaction temperature at or below 90° C. (For Example 4 the JEFFAMINE® D2000 was added slowly with a MIBK rinse to the three other materials after they were combined at a rate to keep the temperature below 90° C. along with an MIBK rinse and held at 75° C. for 27 minutes). For Example 3 an MIBK rinse was also subsequent to the addition of JEFFAMINE® D2000 polyamine. The reaction was held at 75° C. for 60 (27) minutes. An isocyanate equivalent weight (eq. wt.) of 556 (570) was obtained. Dimethylolpropionic acid followed by a rinse of MIBK was added, and the reaction mixture heated to 88° C. When the isocyanate eq. wt. reached 1185 (1132), propylene glycol, and propoxylated trimethylolpropane, for Example 3, or (trimethylolpropane), for Example 4, and MIBK were added to the reaction mixture and rinsed with MIBK. The reaction mixture was held at 100° C. until the isocyanate was consumed (as determined by IR).

For Example 3, the reaction mixture was cooled to 93° C. For Example 4 the reaction was discontinued over night and heated the next day to 95° C. Dimethylethanolamine, and either CYMEL® 1123 and CYMEL® 1135 (or for Example 4 Paraplex WP-1 and CYMEL® 1170) were added and mixed for 10 minutes. For Example 3, the first addition of deionized water was made over one hour, and the dispersion was cooled to 60° C. This temperature was held for 30 minutes before the second addition of deionized water was made over 60 minutes while maintaining a temperature of 60° C. For Example 4 the first addition of deionized water was made to 93% of the above reaction over 34 minutes and the reaction was allowed to mix for 24 minutes. The second addition of deionized water was made over 47 minutes. Both dispersions were vacuum stripped at 60° C. to remove solvent.

For Example 3 the composition was filtered using diatomaceous earth and adjusted with deionized water to a solids content of 34.1 (35.1% weight percent for Example 4). For Example 3, an amount of 953.2 grams of this filtered resin was blended with 97.63 grams of the pigment paste of Example CII(1) and 2.75 liters of deionized water to complete the electrocoat bath formulation.

For Example 4 the anionic thermosetting polyurethane electrodepositable composition was prepared from the polyurethane of Example 4 and the catalyst dispersion of Example 2 Part CI(2) and the pigment paste of Example CII(2). This was performed under continuous agitation from a magnetic stirring bar in a plastic, one gallon sized container, where an amount of 880.7 grams of the polyurethane resin of Example 4 was diluted with 1.5 liters of deionized water. Also 24.66 grams of catalyst dispersion of Example 2 Part CI(2) were diluted with 100 grams of deionized water, and the beaker was rinsed with additional deionized water. An amount of 70.5 grams of the pigment paste of Example CII(2) were diluted with 50 grams, and the beaker rinsed with additional deionized water. Deionized water was added to increase the volume of the electrocoat bath to 3.5 liters, completing the formulation.

Testing of Electrocoat Compositions

Steel panels were coated with a conductive primer cationic electrocoat of Example 1, baked, and then electrocoated with bath formulations of Examples 2 and 3. The steel panels coated with a zinc-iron galvanizing layer, commonly referred to as electrozinc-iron, were pretreated by cleaning and phosphating with CHEMFOS C-700 phosphate pretreatment available from PPG Industries Inc., Pittsburgh, Pa. The resulting panels, supplied as part number APR-24526 by ACT Laboratories, Inc. of Hillsdale, Mich., were coated with the conductive primer composition of Example 1. The panels were coated at 180 volts at 95.5° F. (35.3° C.) for 135 seconds, spray rinsed with deionized water, and baked for 30 minutes at 365° F. (185° C.) in a gas oven. A dry film thickness of 0.7 to 0.75 mils (17.8 to 19 microns) resulted.

After cooling, these primed panels were coated with the second, chip resistant electrocoats of Examples 2 and 3 at 160 volts at a temperature of 85° F. (29° C.). The coating time, bake temperature and film thickness varied between samples as shown in Table 4. During the second electrocoat operation, the panels were removed from the electrocoat bath and spray rinsed with deionized water in the usual manner of the electrocoating process. Furthermore, on the front side of the panel, a 0.1% solution of Surfynol GA surfactant with an HLB of 13+ and a solution cloud point of 135° F., 57° C. (available from Air Products and Chemicals Inc.) in deionized water was flowed over the freshly electrocoated film. After draining, the panels were baked by two methods: 30 minutes at 300° F. (149 ° C.) in an electrically heated oven, and for 30 minutes at 320° F. (160° C.) in a gas fired oven.

Table 4 summarizes the results of testing for film defects and chip resistance. For testing chip resistance, panels were topcoated with NHU-90394/DCT-3000, a white acrylic-melainine topcoat of the basecoat/clearcoat type available from PPG Industries.

TABLE 4

| Bath Formulation | 2D1 | 2D2 | 2D3 | 2D4 | 3 | 2D1 | 2D2 | 2D3 | 2D4 | 3 |
|---|---|---|---|---|---|---|---|---|---|---|
| Coating time, sec. | 45 | 50 | 45 | 45 | 60 | 45 | 50 | 45 | 45 | 60 |
| 30 minute Bake | 300° F. Elec. | 300° F. Elec. | 300° F. Elec. | 300° F. Elec. | 300° F. Elec. | 320° F. Gas | 320° F. Gas | 320° F. Gas | 320° F. Gas | 320° F. Gas |
| Film thickness, mils (microns) | 1.4 to 1.5 (35.6 to 38) | 1.4 to 1.5 (35.6 to 38) | 1.4 to 1.5 (35.6 to 38) | 1.4 to 1.5 (35.6 to 38) | 1.3 (33) | 1.4 to 1.5 (35.6 to 38) | 1.4 to 1.5 (35.6 to 38) | 1.4 to 1.5 (35.6 to 38) | 1.4 to 1.5 (35.6 to 38) | 1.3 (33) |
| Craters per panel, front side[25] | 90, 58, 63 | 3, 2, 5 | 1, 2, 1 | 6, 19, 14 | 5, 2, 0 | 13 | 1 | 2 | 4 | 1 |
| Craters per panel, back side[25] | 24, 29, 19 | 3, 4, 8 | 0, 4, 2 | 2, 5, 6 | 5, 0, 14 | 6 | 8 | 2 | 3 | 5 |
| G.M. Gravelometer Chip[26] | 9+ | 9+ | 9 | 9+ | 9 | 9+ | 9+ | 6 | 9+ | 9+ |
| Kugelstoss[27] | 1.6 | 1.0 | 14.4 | 1.9 | 9.4 | 1.0 | 1.4 | 10.7 | 1.5 | 7.9 |
| 3 mm ball, 75 mph[28] | 0.0 | 0.0 | 19.6 | 0.0 | 12.9 | 0.0 | 0.0 | 18.6 | 0.0 | 5.7 |
| 3 mm ball, 95 mph[28] | 2.7 | 1.9 | 21.6 | 2.2 | 14.4 | 1.4 | 2.1 | 19.3 | 1.7 | 15.7 |

[25]Multiple numbers represent replication, for example three separate panels. The film defects in these dried films were a common type of electrocoat defect, depressions in the shape of a crater which were counted.
[26]Chip Resistance using General Motors Engineering Standard GM9508P where the ratings given are on a scale of 0 to 9 with 0 being severely chipped and 9 representing outstanding chip resistance.
[27]For Kugelstoss testing, topcoated panels were stored in a freezer at −20 C. for at least two hours, and then shot with a 2 mm chrome steel ball at a velocity of 155 miles per hour (249 km hour). The ball impacted the coated test panel at 90°, or perpendicular to the surface. After removing from the freezer, raised and loosened portions of the paint system were removed with a sharp tool. The total area of damage was measured and the results reported in square millimeters of damage.
[28]For impact testing with 3 mm balls, the same method was used as with Kugelstoss, except that 3 mm chrome steel balls were shot at 75 miles per hour (121 km/hr.) and 95 miles per hour (153 km/hr.).

The electrocoat bath of Example 4 was applied by electrocoating over a substrate which consisted of 0.74 mils (18.8 microns) of a cured, conductive black electrocoat on a phosphated electrozinc-iron steel panel. This electrocoat is available from PPG Industries Inc. Connecting the substrate as the anode, the composition of Example 4 was coated for 120 volts, at 85° F. (29° C.) bath temperature, for 50 seconds. After removal from the electrocoat bath, it was spray rinsed with deionized water in the usual manner. Furthermore, on the front side of the panel, a 0.1% solution of Surfynol GA surfactants in deionized water was flowed over the freshly electrocoated film. After draining, the panel was baked for 10 minutes at 200° F. (93 ° C.) in an electric oven, the temperature of the oven set to 250° F. (121 ° C.), and the panel baked for an additional 20 minutes. A cured, solvent resistant coating resulted which had a film thickness of 1.29 mils (32.8 microns). After 100 double rubs with an acetone soaked cloth, only a trace dulling of the cured film was observed.

Comparative Examples 1 and 2

The following chip tests were done over a powder primer surfacer known in the industry to have excellent chip resistance, PCV-70100 available from PPG Industries, Inc. The substrate for the powder coating was Electrozinc-iron with a CHEMFOS 700/C20 phosphate pretreatment and a chrome rinse also available from PPG Industries Inc. After phosphating, the panels were coated with ED5100 electrocoat (available from PPG Industries, Inc.), and then powder coated. The topcoat used for chip testing is the same as for Examples 2 and 3 above, NHU-90394/DCT-3000. Since the chip resistant coating was not electrodeposited there was neither a voltage nor a coating temperature and coating time of electrodeposition. After application of the topcoat on the chip resistant coating, the coatings were baked at 340° F. (171° C.) in an electric and gas-fifed oven to give a film thickness of 3 mils (75 microns). Table 5 shows testing of this type of chip resistant coating in such a composite coating system of one coat electrocoated layer, spray applied chip resistant coating and topcoat layer.

TABLE 5

| Formulation | Comparative Example 1 PCV-70100 | Comparative Example 2 PCV-70100 |
|---|---|---|
| Craters per panel, front side | 2, 5, 1, 2 | 3, 8, 9, 6 |
| Craters per panel, back side | Not Applicable | Not Applicable |
| G.M. Gravelometer Chip Rating | 9+ | 9+ |
| Kugelstoss | 18.7 | 4.9 |
| 3 mm ball @ 75 mph | 9.7 | 1.4 |
| 3 mm ball @ 95 mph | 22.2 | 15.0 |
| Cure | Electric | Gas |

Example 5: Preparation of Cationic Thermosetting Polyurethane Electrodepositable Composition Cationic Pigment Paste for Cationic Polyurethane Example 5 Part A: Preparation of Cationic Polyurethane Resin Isophoronediisocyanate (1200.6 g, 10.82 eq.), methylisobutyl ketone (520.2 g), and dibutyltindilaurate (0.6 g) were charged to a round bottom flask. The mixture was heated to 30° C. Trimethylolpropane (125.1 g, 2.80 eq.) was then added to the solution. After the addition, the temperature rose to 73° C. Caprolactam (382.9 g, 3.38 eq.) and MIBK (40.0 g) were added to the flask. The mixture was maintained at 85° C. until an isocyanate (NCO) eq. wt. of 490 was obtained. Terethane®650 is polytetrahydrofuran of 650 molecular weight which is available from DuPont. An amount of this PolyTHF of (707.9 g, 2.21 eq.) and MIBK (275.7 g) were then added to the flask. The addition was made at a rate such that the temperature was maintained below 90° C. After the addition was complete, the temperature was allowed to drift down to 65° C. At 65° C., Jeffamine®D2000(437.0 g, 0.44 eq.), and MIBK (40.0 g) were added and the mixture was held for 15 minutes. After the hold, an NCO eq. wt. of 1974 was obtained. Diethanolamine (87.0 g, 0.83 eq.) and 125 g aminopropyldiethanolamine (125.2 g, 0.77 eq.) were then added to the reaction mixture. The solution was held at 80° C. until no NCO was present by IR analysis. After the isocyanate was consumed, 31 g Surfynol® GA surfactant (30.7 g) and MIBK (40.0 g) were added and the solution was mixed for 15 minutes. The resin was then dispersed into deionized water (1,666.0 g) and dimethylolpropionic acid (82.9 g, 0.62 eq). The resin was further thinned with deionized water (3,303.0 g), resulting in a final dispersion at 36.5% solids. The dispersion was subsequently vacuum stripped at 60° C. to remove solvent.

Example 5 Part B

The following materials were mixed with a Cowles blade and then dispersed with conventional pigment dispersing equipment to a Hegman reading of 7+:

| | |
|---|---|
| Epoxy grind resin[29] | 1466.1 |
| deionized water | 294.7 |
| Titanium Dioxide[30] | 1166.4 |
| Transparent Red Iron Oxide[31] | 137.2 |
| Phthalo Blue[32] | 17.2 |
| Carbon Black[33] | 51.5 |

[29]sulfonium-quaternary ammonium type described in U.S. Pat. No. 5,130,004 (PPG Industries, Inc., Johnson & McCollum) with a solids content of 31.2 percent.
[30]See footnote 18a.
[31]See footnote 19.
[32]See footnote 20.
[33]See footnote 17a.

The resulting pigment paste had a calculated solid content of 58.4 weight percent.

Example 5 Part C: Cationic Polyurethane Electrocoat Composition 1067.9 grams of the resin of example 5 Part A was blended with 105.8 grams of the pigment paste of example 5 Part B and diluted with water to a total volume of 3.8 liters.

Testing of Cationic Polyurethane Electrocoat

The same type of steel panel from Examples 2 and 3, phosphated electrozinc-iron, was electrocoated with the conductive primer of Example 1 and baked for 30 minutes at 365° F. (185° C.) in a gas oven to give a dry film thickness of 0.7 to 0.75 mils (17.8 to 19 microns). A dry film thickness of 0.7 to 0.75 mils (17.8 to 19 microns) resulted. The coating conditions here were for coating add in and may not have been similar to those of aforementioned examples.

After cooling, this primed panel was electrocoated with the cationic polyurethane electrocoat bath of Example 5. After the second electrocoat operation, the panel was removed from the electrocoat bath and spray rinsed with deionized water in the usual manner of the electrocoating process. Furthermore, on the front side of the panel, a 0.1% solution of Surfynol GA surfactants in deionized water was flowed over the freshly electro-coated film. After draining, the panel was baked for 30 minutes at 350° F. (177° C.) in an electric oven. It was topcoated with the same topcoat system used in Example 3, NHU-90304/DCT-3000 available from PPG Industries Inc. Test results are summarized in Table 6.

TABLE 6

| Formulation | Cationic Polyurethane of Example 5 |
|---|---|
| Coating voltage | 175 |
| Coating Temperature, ° F. (° C.) | 86 (30) |
| Coating time, sec. | 95 |
| Film thickness, mils (microns) | 1.2 (30.5) |
| Craters per panel, front side | Not Available |
| Craters per panel, back side | 2 |
| G.M. Gravelometer Chip Rating | 9+ |
| Kugelstoss | 1 |
| 3 mm ball @ 75 mph | 0 |
| 3 mm ball @ 95 mph | 1 |

Comparing the results of the electrodeposited thermoset anionic polyurethane chip resistant coating of Table 4 and the electrodeposited thermoset cationic polyurethane of Table 6 with the commercial spray chip resistant coating of Table 5 indicates that the electrodeposited coatings can perform better than the commercially available spray coatings. Particularly from the results in Table 4 it can be seen that the polyurethane coatings of this invention can result in excellent chip resistance. The resistance to high speed impacts, are superior for the polyurethane chip resistant electrodeposited coatings of the present invention versus that of a commercial primer surfacer, which is an important improvement.

The Gravelometer Chip results between the electrodeposited coatings and the spray indicated equal excellent performance except for a slightly inferior but acceptable performance of the anionic polyurethane without polytetrahydrofuran and with polypropylene oxide polymer flexibilizing segment. For the Kugelstoss and impact tests all of the electrodeposited coatings with polytetrahydrofuran flexibilizing segments performed better than the commercially available sprayed chip resistant coating. The use of polytetrahydrofuran is particularly useful. When polytetrahydrofuran is omitted, as in example 2D3 of Table 4, chip resistance, although still worthwhile, decreases, as evidenced by larger areas of damage from ball impacts. Particularly, it is desirable for the Kugelstoss test to have less than 8 square millimeters of damage. Also the electrodeposited coating with all polypropyleneoxide flexibilizing segments performed comparably to that of the commercially available spray chip resistant composition. The data also show that including some polypropylene oxide in the formulation, either built into the polymer as in example 2D2 Table 2, or added as free polyol as in Example 2D4 Table 4, is beneficial for film appearance and a reduction in crater defects. Thus, a combination of polytetrahydrofuran and polypropylene oxide in the formulations of this invention provide both good chip resistance and film appearance.

We claim:

1. A process of electrocoating electrically conductive substrates with two electrodeposited layers, comprising the steps of:

(a) electrodepositing an electrically conductive coating from a composition comprising a curable ionic resin and an electroconductive pigment;

(b) at least partially curing the electrodeposited coating so as to make the coating electrically conductive;

(c) electrodepositing a second coating on the electrically conductive coating from step (b); the second coating being deposited from a composition comprising a curable ionic polyurethane resin that contains ionic salt terminal end groups and a polymeric segment derived from an active hydrogen-containing polymer having a glass transition temperature of 0° C. or less and a number average molecular weight of 400–4000; and (d) curing the second coating from step (c).

2. The process of claim 1 in which the polyurethane coating is derived from the reaction product of:

(a) a polyisocyanate, and (b) an active hydrogen-containing polyether.

3. The process of claim 2 which contains as a further component (c), an active hydrogen-containing compound which contains a group that can be converted to an ionic group.

4. The process of claim 3 in which (c) is an active hydrogen-containing compound that contains carboxylic acid groups or amino groups.

5. The process of claim 3 which contains as a further component (d), an active hydrogen-containing compound having a molecular weight below 400.

6. The process of claim 2 in which the polyisocyanate is an aliphatic or cycloaliphatic polyisocyanate.

7. The process of claim 6 in which the polyisocyanate is isophorone diisocyanate, 1,6-hexamethylene diisocyanate and isocyanurates thereof.

8. The process of claim 2 in which the active hydrogens of the active hydrogen-containing polyether are hydroxyl or primary amine.

9. The process of claim 2 in which the active hydrogen-containing polyether comprises (i) a polyoxytetramethylene diol.

10. The process of claim 9 in which the active hydrogen-containing polyether further comprises (ii) a polyoxypropylene polyol or polyoxypropylenepolyamine.

11. The process of claim 10 in which the weight ratio of (i) to (ii) is 0.5–10: 1.

12. The process of claim 9 in which the active hydrogen-containing polyether further comprises an oxyalkylated triol.

13. The process of claim 2 in which (b) is present in an amount of at least thirty (30) percent by weight of reactants used in making the polyurethane.

14. The process of claim 1 in which the curable polyurethane contains active hydrogens and a curing agent having groups which are reactive with the active hydrogens.

15. The process of claim 14 in which the curing agent is an aminoplast or a capped polyisocyanate.

16. The process of claim 1 wherein the second coating contains an opacifying pigment.

17. The process of claim 16 wherein the opacifying pigment is selected from the group consisting of non-transparent iron oxides and transparent iron oxides.

18. The process of claim 1 wherein the second coating contains a hindered amine light stabilizer.

19. The process of claim 1 in which the polyurethane resin further contains a segment derived from a polymeric polyol selected from polyester polyols and polycarbonate polyols.

20. The process of claim 1 in which the electrically conductive coating is deposited from a cationic electrodepositable composition.

21. The process of claim 1 in which the second coating is deposited from an anionic electrodepositable composition.

22. The process of claim 21 in which the second coating is deposited from an anionic composition that further contains an aminoplast curing agent.

23. The process of claim 22 in which the aminoplast is present in an amount of from 5 to 50 percent by weight based on weight of resin solids.

24. The process of claim 1 in which the second coating is deposited from a cationic electrodepositable coating composition.

25. The process of claim 24 in which the second coating is derived from an active hydrogen-containing cationic electrodepositable composition that further contains a capped polyisocyanate curing agent.

26. The process of claim 25 in which the polyisocyanate is capped with caprolactam and/or dibutylamine.

27. The process of claim 25 which has an NCO/active hydrogen equivalent ratio of 1.0 to 1.5:1.

28. The process of claim 1 wherein the electroconductive coating has resistivity of less than $10^{12}$ ohms-centimeters.

29. The process of claim 1 wherein the electrodeposited coating of step (a) is at least partially cured by infrared radiant heating.

30. The process of claim 29 wherein the infrared radiant heating is directed to a predetermined area of the electrodeposited coating.

31. The process of claim 30 wherein the substrate is a body for a motor vehicle with internal and external metallic surfaces and the electrodeposited coating is partially cured by directing infrared radiant heating to the external metallic surfaces coated with the electrodeposited coating so as to partially cure the coating on the exterior metallic surface, while leaving the electrodeposited coating on the interior surface essentially uncured.

32. The process of claim 31, wherein the infrared heating is for a time of between 10 seconds and 2 hours.

33. The process of claim 32 wherein prior to infrared heating the electrodeposited coating is subjected to convection heating under conditions sufficient to remove water but insufficient to produce a conductive coating.

34. The process of claim 1 wherein the partial curing is at a temperature in the range of 120° C. to 220° C. (248° F.–428° F.).

35. The process of claim 1 wherein the conductive substrate is selected from the group consisting of steel, zinc, aluminum, copper, magnesium, galvanized metals, hot dip galvanized steel and electrogalvanized steel.

36. A substantially organic solvent-free aqueous electrodepositable composition comprising a curable polyurethane resin containing ionic salt terminal end groups dispersed in an aqueous medium; the polyurethane being the reaction product of:

(a) a polyisocyanate, and (b) an active hydrogen-containing polymer having a glass transition temperature of 0° C. or less and a number average molecular weight of 400–4000.

37. The aqueous composition of claim 36 in which the polyisocyanate is an aliphatic or cycloaliphatic polyisocyanate.

38. The aqueous composition of claim 36 in which (b) is an active hydrogen-containing polyether.

39. The aqueous composition of claim 36 in which (b) comprises a mixture of (i) polyoxytetramethylene diol and (ii) polyoxypropylene polyol in which the weight ratio of (i) to (ii) is from 0.5–10:1.

40. The aqueous composition of claim 36 in which (b) is present in an amount of at least 30 percent by weight based on weight of reactants used to make the polyurethane.

41. The aqueous composition of claim 36 which contains as a third component (c) an active hydrogen-containing compound having a molecular weight below 400.

42. The aqueous composition of claim 36 in which the curable polyurethane resin has active hydrogen groups and a curing agent having groups which are reactive with the active hydrogens.

43. The aqueous composition of claim 42 in which the curing agent is an aminoplast or a capped polyisocyanate.

44. The aqueous composition of claim 43 in which the capped polyisocyanate is capped with caprolactani and/or dibutylamine.

45. The aqueous composition of claim 43 in which the capped polyisocyanate is integral with the polyurethane backbone.

46. The aqueous composition of claim 36 in which the reactants used to prepare the polyurethane contain an active hydrogen and a group which can be converted to an ionic salt group.

47. The aqueous composition of claim 46 in which the group is carboxylic acid or amine.

48. The aqueous composition of claim 36 in which the curable polyurethane contains carboxylate salt groups and an aminoplast curing agent.

49. The aqueous composition of claim 36 which contains an opacifying pigment.

50. The aqueous composition of claim 36 which contains a hindered amine light stabilizer.

51. The aqueous of claim 36 having a resin solids content of 5 to 50 percent by weight.

52. The aqueous composition of claim 36 in which (b) comprises a mixture of (i) polyoxytetramethylene diol or diamine and (ii) polyoxypropylene polyol or polyamine, in which the weight ratio of (i) to (ii) is from 0.5–10:1.

53. A substantially organic solvent-free cationic aqueous electrodepositable composition comprising an active hydrogen-containing polyurethane resin having cationic salt groups dispersed in an aqueous medium; the polyurethane being the reaction product of:
  (a) an aliphatic or cycloaliphatic polyisocyanate,
  (b) an active hydrogen-containing polyether which comprises a mixture of:
    (i) a polyoxytetramethylene diol and
    (ii) a polyoxypropylenepolyamine;
    the weight ratio of (i) to (ii) being from 0.5 to 10:1,
  (c) an active hydrogen group containing a tertiary amine group; the polyurethane being at least partially neutralized with acid; the composition also containing a capped polyisocyanate curing agent.

54. The aqueous composition of claim 53 in which the capped polyisocyanate is capped with caprolactam and/or dibutylamine.

55. The aqueous composition of claim 53 in which the capped polyisocyanate is integral with the polyurethane backbone.

56. The aqueous composition of claim 53 which has an active hydrogen/isocyanate equivalent ratio of 1 to 1.5:1.

* * * * *